United States Patent [19]

Winkler

[11] Patent Number: 4,717,471

[45] Date of Patent: Jan. 5, 1988

[54] APPARATUS FOR SCREENING PAPER FIBER STOCK

[75] Inventor: Jimmy L. Winkler, Middletown, Ohio

[73] Assignee: The Black Clawson Company, Middletown, Ohio

[21] Appl. No.: 58,619

[22] Filed: Jun. 4, 1987

Related U.S. Application Data

[63] Continuation of Ser. No. 772,809, Sep. 5, 1985, abandoned.

[51] Int. Cl.[4] .......................... B07B 1/04; B07B 1/20; B07B 1/50; B07B 1/52
[52] U.S. Cl. .................................... 209/273; 209/300; 209/306; 209/379; 209/389; 209/397
[58] Field of Search ............... 209/273, 300, 305, 306, 209/379, 389, 397; 210/415

[56] References Cited

U.S. PATENT DOCUMENTS

| 2,942,730 | 6/1960 | Fontein | 209/273 X |
| 3,680,696 | 8/1972 | Morin | 209/273 X |
| 4,276,159 | 6/1981 | Lehman | 209/273 |
| 4,287,055 | 9/1981 | Holz | 209/273 X |
| 4,447,320 | 5/1984 | Lamort | 209/273 |
| 4,529,520 | 7/1985 | Lampenius | 209/397 X |

Primary Examiner—Andres Kashnikow
Assistant Examiner—Patrick N. Burkhart
Attorney, Agent, or Firm—Biebel, French & Nauman

[57] ABSTRACT

In screening apparatus for paper making fiber incorporating a cylindrical screen member provided with cylindrical screening perforations, each of the perforations is characterized by a concentric frustoconical inlet end portion having a maximum diameter at the inlet surface of the screening member which is substantially greater than the portion of the perforation of minimum diameter, the maximum diameter of these inlet end portions being such that adjacent such portions closely approach or intersect each other to define multiple ridges on the surface of the inlet side of the screening member.

19 Claims, 4 Drawing Figures

APPARATUS FOR SCREENING PAPER FIBER STOCK

REFERENCE TO RELATED APPLICATION

This is a continuation of application Ser. No. 772,809, filed Sept. 5, 1985, and now abandoned.

BACKGROUND OF THE INVENTION

Paper mills have for many years made extensive use, for the cleaning of paper making stock, of screening apparatus embodying a cylindrical perforated screening member defining inlet and accepts chambers on the opposite sides thereof in a closed housing and including a rotor member which operates in one of the chambers to keep the screening perforations open and free from solid material tending to cling to the screening surface. Commonly, the stock or furnish is delivered to the inlet chamber adjacent one end of the screening cylinder, and the material rejected by the screening cylinder is collected and discharged from its opposite end.

The assignee of this invention has manufactured and sold many such screens in accordance with a series of U.S. patents, commencing with U.S. Pat. Nos. 2,347,716, to Staege and followed by 2,835,173; to Martindale, 3,849,302 and 4,105,543 to Seifert and 4,155,841 and 4,383,918 to Chupka-Seifert. Starting with the construction shown in the Martindale patent, all such screens manufactured and sold by applicant's assignee have been characterized by a rotor comprising bars or vanes of airfoil section moving in closely spaced but non-contacting relation with the surface of the screening cylinder for the purpose of creating alternating positive and negative pressure waves effective on the perforations in the screening cylinder to prevent plugging thereof.

The art has experimented widely with detailed variations in screens of the above type, including variations in the vane shape and other forms of rotor, and also in the size, configuration, and spacing of the perforations in the screening cylinder. Thus in the era of the Staege patent in the mid-1940's, the screening cylinder was fabricated from steel plate with multiple uniformly cylindrical drilled perforations. When this drilled plate was rolled into a cylinder, a natural result of the rolling operation was to effect some constriction and expansion, respectively, of the inner and outer ends of the drilled holes which were on the inlet (inside) and accepts (outside) surfaces of the resulting screening cylinder. This led in due course to the practice of relieving the accepts (discharge) end of each cylindrical perforation by a conical bore or countersunk portion to minimize the possibility of plugging.

In more recent years, the trade has been offered pressure screens generally of the above type wherein the perforations in the screening cylinder are elongated slots rather than round holes, typical such constructions being shown in U.S. Pat. Nos. 3,617,008, to Lamort, 3,581,903, to Holz, and the above-noted Seifert '302 and Chupka-Seifert patents. Both Lamort and Holz show slotted screening cylinders wherein the slots have parallel sided portions on the inlet side of the cylinder, but on the accepts side, each slot has widely diverging side walls. Similarly in Chupka-Seifert, the screening cylinder is fabricated from wire of triangular section with the base of the triangle on the inlet side of the cylinder.

This practice of providing relief on the accepts side of the perforations in the screening cylinder of a pressure screen was thus followed consistently in the paper industry since it was first introduced. The art demonstrated a conviction that this practice was necessary to minimize the possibility that the perforations would be plugged by the fiber and/or contaminant particles unless their minimum dimension is at their inlet ends. Indeed, this conviction became so firm that all of the claims of the Holz patent include limitations to a "boat-shaped" configuration of the screening slots on the accepts side of the screening cylinder.

Another patent issued to the assignee of this invention, Lehman U.S. Pat. No. 4,276,159, disclosed the discovery that the prior art had been wrong in its conviction that the screening perforations in the screening cylinder of a pressure screen needed to be relieved on the accepts side of the cylinder. More specifically, that patent disclosed that not only will such screens operate without plugging when the screening perforations are not relieved on the accepts side of the cylinder, but most unexpectedly, significantly improved results are obtainable when the perforations are relieved on the inlet side of the cylinder, e.g. in the same manner and to the same extent has had commonly been done on the accepts side of the cylinders of the prior art.

A recent modification of the Lehman patent screen is disclosed in Lampenius U.S. Pat. No. 4,529,520, wherein the inlet side of a screen cylinder is provided with axially extending grooves of trapezoidal section, and cylindrical screening holes are drilled in the bottoms of these grooves. The feature claimed in the Lampenius patent is that the downstream side of each groove is at a relatively oblique angle to the flow direction of the stock therepast, preferably an angle of approximately 30°, and in this respect, Lampenius closely followed the teaching in Fredriksson Canadian Patent No. 972,322, wherein screening perforations are shown on the upstream side of grooves or are provided with a countersunk relief on their downstream sides. The emphasis in both of those patents is on the desirability of reducing the target area of the inlet side of each screening perforation which is "seen" by the fibers in the flow therepast.

SUMMARY OF THE INVENTION

In the screen of the Lehman patent, the screening perforations—both slots and cylindrical holes—are shown as arranged with their portion of minimum diameter at the surface of the accepts side of the screening cylinder. This portion of each hole or slot is of relatively small or short axial extent, and the remainder of the hole or slot is expanded in diameter or width toward the inlet side of the cylinder and reached its maximum dimensions at the inlet surface of the cylinder.

In accordance with the present invention, it has been discovered that unexpectedly significant advantages in operation are achieved with screening members employing cylindrical screening holes if the portion of each hole facing the inlet side of the cylinder is contoured to a substantially larger diameter than that of the minimum diameter portion, while keeping its axial dimension small or short, e.g. by countersinking to a maximum diameter two or more times that of the minimum diameter. This countersunk portion, however, preferably has an angle of taper which is relatively small with respect to the surrounding surface of the screening member, e.g. 22.5°, so that each of the countersunk portions is correspondingly shallow.

In a preferred embodiment of the invention, the screening holes are arranged in rows both axially and circumferentially of the screening member, and thus also in rows extending spirally around the cylinder. The depth and angle of the countersunk portions of the holes are such that adjacent portions overlap or closely approach each other in one or more of those directions so as to cover by far the major fraction of the surface of the cylinder and to provide multiple relatively sharp ridges along their overlapping portions. The remainder of each hole may be uniformly cylindrical, but preferably it will include a relatively short cylindrical portion of minimum diameter adjacent the countersunk inlet portion, while the rest of the hole will be tapered outwardly at a small angle to the centerline of the portion of minimum diameter, to provide each hole in axial section with an outline like that of a short-stemmed wine glass.

DESCRIPTION OF THE PREFERRED EMBODIMENTS

Figure 1:
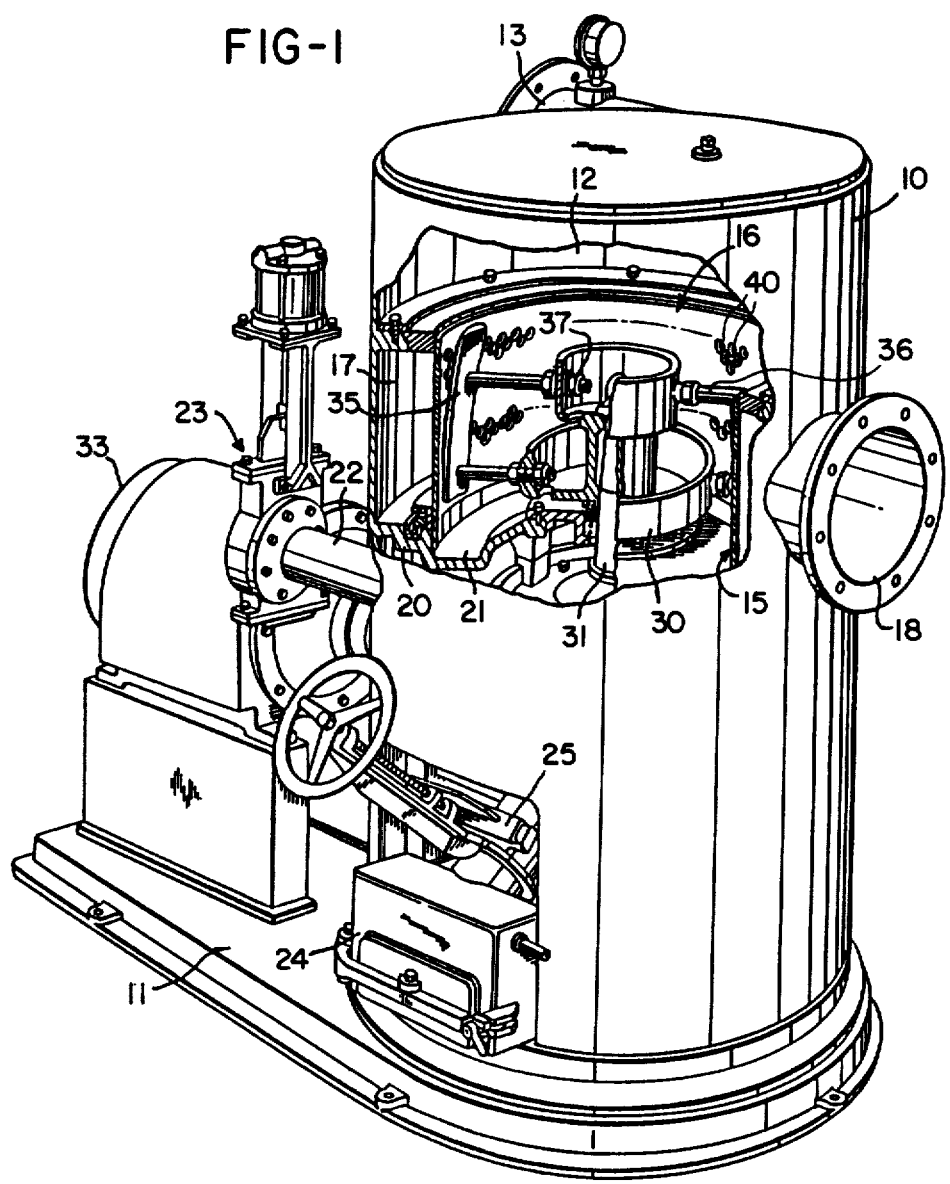
FIG. 1 is a perspective view, partly broken away, of pressure screening apparatus embodying the invention.

The screening apparatus shown in FIG. 1 is constructed generally in accordance with Seifert U.S. Pat. No. 4,105,543, with certain exceptions in accordance with the invention. It comprises a main housing 10 on a base 11, and in the upper end of the housing is an inlet chamber 12 having a tangential inlet port 13 to which the furnish is supplied under pressure as is customary with such screening apparatus. A cylindrical screening member 15 divides the interior of the housing below chamber 12 into a central supply chamber 16 and an accepts chamber 17 having an outlet port 18.

The bottom wall 20 of the supply chamber 16 includes a trough 21 leading to a discharge port 22 provided with a control valve assembly 23 which can be preset to provide a desired continual bleed of reject-rich stock. Heavy particles which settle into the trough 21 drop therefrom to the heavy trash collection box 24 by way of manually controlled valve 25 for intermittent removal.

A rotor 30 is supported on a drive shaft 31 in the center of the supply chamber 16 and is driven through suitable gearing or belts by a motor 33 also mounted on the base 11. Vanes or bars 35 are mounted on the rotor 30 by support rods 36, and adjustable connections 37 between the inner ends of rods 36 and rotor 30 provide for positioning the vanes 35 in properly spaced relation with the inner surface of screening member 15, in accordance with standard practices.

The vanes 35 extend the full length of the screening surface of screen member 15, and they are helically curved and so arranged that the upper end of each vane is spaced forwardly of the lower end in the direction of rotation of the rotor, shown as clockwise. Two vanes 35 are shown, but other numbers can be used, and in general a greater number, e.g., four, may make possible improved operation at higher consistencies.

The screening cylinder 15 is provided with multiple screening holes 40 of circular section, which for ease of fabrication should be arranged in rows extending both circumferentially and axially of the cylinder, and which in practice will cover substantially the entire surface of the cylinder. These holes are preferably drilled or otherwise fabricated in flat metal plate, which is then rolled to cylindrical form and has its abutting edges welded together. Typical plate stock which has been found satisfactory for the practice of the invention is stainless steel 0.188 inch in thickness.

Figure 4:
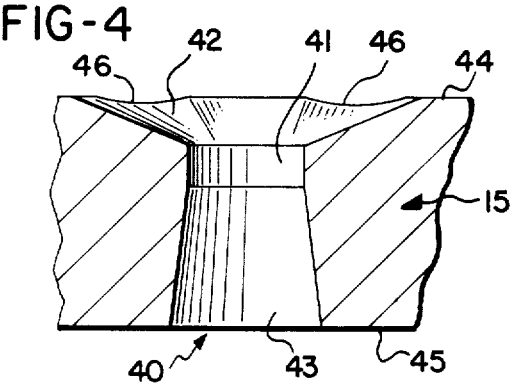
FIG. 4 is a further enlarged fragmentary section on the line 4—4 of FIG. 2.

Referring specifically to the enlarged view in FIG. 4, each hole 40 is composed of three concentric portions, an internal cylindrical portion 41 of predetermined minimum diameter, an inlet portion 42, and a discharge portion 43. The inlet portion 42 has a diameter which increases rapidly from a minimum, where it coincides with the diameter of the cylindrical portion 41, to a maximum at the surface 44 which is substantially greater than its minimum diameter. The portion 41 of minimum diameter may extend all the way to the discharge side 45, as in the Lehman patent, but preferably the discharge portion 43 is slightly outwardly tapered to reduce the axial length of the cylindrical portion 41, satisfactory results having been obtained with the portion 43 tapering at an angle of 7° to the centerline of cylindrical portion 41.

It has been found important to the success of the invention that the axial dimension of each inlet portion 42 be substantially less than its maximum diameter at the inlet side 44 of the screening member, so that it will be relatively shallow but will have a relatively extended outer periphery. This condition can readily be established by forming the inlet portion 42 by conventional countersinking with a relatively flat taper angle, as illustrated in FIG. 4, and excellent results have been obtained with an angle of taper of 22.5° with respect to the surface of the plate.

As shown, the axial dimensions of the three individual portions 41–43 are such that the combined axial dimensions of the portions 41 and 42 total less than that of the discharge portion 43. For example, highly satisfactory results have been obtained with this combined axial length in the range of 0.040 to 0.060 inch in steel plate 0.188 inch in thickness, so that the discharge portion 43 is two or more times the axial length of the combined portions 41 and 42.

Figure 2:
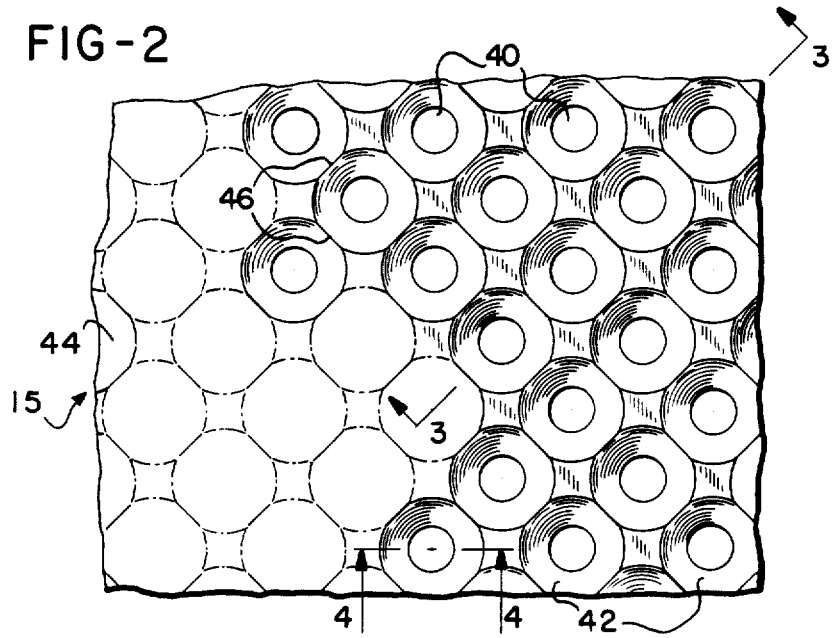
FIG. 2 is an enlarged fragmentary view of the inlet side of the screening cylinder in the screen of FIG. 1 prior to formation of the cylinder from a flat metal sheet.
Figure 3:
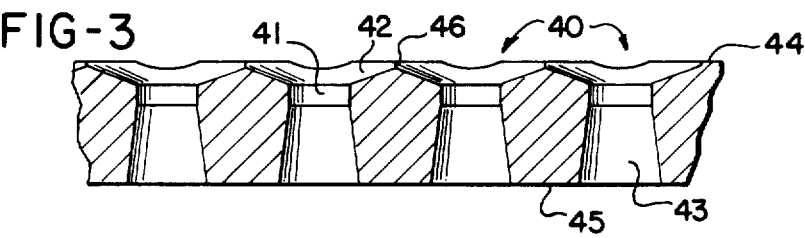
FIG. 3 is a fragmentary section on the line 3—3 of FIG. 2.

The diameter and depth of each inlet portion 42 are specially related to the size of the associated cylindrical portion 41 and the spacing of adjacent holes 40. For preferred results in the practice of the invention, the relative spacing of adjacent holes and the maximum dimension of their inlet portions 42 should be such that the combined areas of the countersunk faces will constitute a large major fraction of the total surface 44 of the screening member. A result of this condition will be that adjacent inlet portions will so closely approach or overlap each other in at least one direction as to define multiple relatively sharp ridges 46 of arcuate contour over the entire surface 44. Also, as it is apparent form FIG. 2, even if the maximum diameter of the inlet portions 42 is such that none touch each other, they will still project axially and circumferentially of the cylinder into the spaces between adjacent inlet portions in the rows on either side thereof and thus overlap such adjacent inlet portions without actually intersecting.

For example, in one embodiment of the invention, the minimum diameter for each hole 40 was 0.050 inch, and adjacent holes were spaced 0.125 inch on centers circumferentially of the screen member and 0.272 inch axially thereof. Then with each inlet portion 0.020 inch in maximum depth, the maximum radius (r) was 0.0733 inch, which gave a maximum overlap of 0.022 inch circumferentially of the cylinder and 0.010 inch spirally of the cylinder. This combination of dimensions resulted in having the total of the countersunk areas ($\pi r^2$ times the total number n of holes) exceed 80% of the surface 44, with the remaining plane areas being discontinuous and of individually small size.

In another example, the holes 40 had a minimum diameter of 0.062 inch and their spacing circumferentially and axially of the screen member was respectively 0.250 inch and 0.219 inch. With each inlet portion 0.030 inch deep at its inner periphery, the outer diameter of each inlet portion was 0.224 inch, which provided a maximum overlap of 0.102 inch spirally of the screening member and a maximum overlap of 0.005 inch circumferentially of the screening member. The combined total of the countersunk areas ($\pi r^2 n$) would theoretically exceed the area of surface 45, except for the overlaps. In another example, the holes 40 had a minimum diameter of 0.125 inch and their spacing circumferentially and axially of the screen member was respectively 0.250 inch and 0.375 inch. With each inlet portion 0.030 inch deep at its inner periphery, the outer diameter of each inlet portion was 0.27 inch, which provided an overlap of 0.020 inch between adjacent inlet portions axially of the screening member and 0.045 inch spirally of the screening member, and a ridge 46 having a minimum width of 0.10 inch between adjacent inlet portions axially of the screening member. The total of the countersunk areas ($\pi r^2 n$) would again theoretically exceed the area of surface 45, except for the overlaps.

Analysis of these examples will show that in each case, the countersunk areas will cover by far the majority of the surface of the inlet side of the screening member, and will provide a great multiplicity of relatively sharp arcuate edges or ridges. Testing of a number of such examples indicates that the combination of the resulting irregular surface of the screening member with the hydraulic action of the vanes or foils on the rotor results in patterns of irregular eddies adjacent the inlet to each of the screening holes which greatly promote efficient screening action.

While the forms of apparatus herein described constitute preferred embodiments of this invention, it is to be understood that the inventon is not limited to these precise forms of apparatus, and that changes may be made therein without departing from the scope of the invention which is defined in the appended claims.

What is claimed is:

1. Screening apparatus for paper making stock comprising, a pressure housing, a cylindrical screening member of predetermined uniform thickness dividing the interior of said housing into an inlet chamber and an accepts chamber, said screening member having multiple screening perforations therethrough, and a rotor mounted for rotation in said housing on an axis concentric with that of said screening member and including means for creating alternative positive and negative pressure waves effective on said perforations to prevent plugging thereof, said screening member being further characterized in that:

(a) each of said perforations is circular in cross section and includes a portion of predetermined minimum diameter which is cylindrical,
   (b) each of said perforations includes a frustoconical inlet end portion concentric with said cylindrical portions which faces said inlet chamber and has a maximum diameter at the surface of said screening member that is substantially greater than both said minimum diameter and the axial dimension of said inlet portion,
   (c) said axial dimension of said inlet portion constitutes a minor fraction of the thickness of said screening member and of said maximum diameter of said inlet portion,
   (d) said perforations are arranged in rows which define directions extending perpendicularly to each other along said cylindrical screening member,
   (e) the spacing of adjacent said perforations and said maximum diameter of said inlet portions thereof are such that each inlet portion projects into space between adjacent said inlet portions in said rows extending on either side thereof in at least one of said perpendicular directions, and
   (f) the relative spacing of adjacent said perforations and the maximum diameter of said inlet portions thereof are such that adjacent said inlet portions define ridges on the surface of the inlet side of said screening member which cooperate with said rotor to create patterns of irregular eddies adjacent the inlet ends of said perforations.

2. Screening apparatus as defined in claim 1 wherein the spacing of adjacent said perforations and said maximum diameter of said inlet portions thereof are such that each said inlet portion projects into space between adjacent said inlet portions in said rows extending on either side thereof in both of said perpendicular directions.

3. Screening apparatus as defined in claim 1 wherein said perforations are arranged in rows extending axially and circumferentially of said screening member, and wherein the spacing of adjacent said perforations and said maximum diameter of said inlet portions thereof are such that each said inlet portion projects into space between adjacent said inlet protions in said rows extending on either side thereof both axially and circumferentially of said screening member.

4. Screening apparatus as defined in claim 1 wherein the sum of the areas covered by said inlet portions including said cylindrical portions associated therewith is substantially greater than one-half the total surface area of said screening member.

5. Screening apparatus as defined in claim 1 further characterized by the fact that the value $\pi r^2 n$, wherein r is the maximum radius of each of said inlet portions and n is the total number of said perforations, equals more than three-quarters of the total surface area of said screening member.

6. Screening apparatus as defined in claim 5 wherein the value $\pi r^2 n$ exceeds the total surface area of said screening member.

7. Screening apparatus as defined in claim 1 wherein each of said perforations includes a discharge end portion which is of progressively greater diameter in the direction of said accepts chamber than said minimum diameter and is greater in axial length than the sum of the axial dimensions of said cylindrical portion and said inlet portion of said perforation.

8. Screening apparatus as defined in claim 7 wherein the total of the axial dimensions of said inlet portion and said cylindrical portion of each said perforation is less than one-half the thickness of said screening member.

9. A cylindrical screening member for paper making stock having multiple screening perforations therethrough and particularly adapted for use in the screening of paper making stock in combination with a pressure housing wherein said screening member divides the interior into an inlet chamber and an accepts chamber, and which includes a rotor mounted for rotation on an axis concentric with that of said screening member and including means for creating alternating positive and negative pressure waves effective on said perforations to prevent plugging thereof, said screening member being further characterized in that:
 (a) each of said perforations is circular in cross section and includes a portion of predetermined minimum diameter which is cylindrical,
 (b) each of said perforations includes a frustoconical inlet end portion concentric with said cylindric portion which has a maximum diameter at the surface of said screening member that is substantially greater than both said minimum diameter and the axial dimension of said inlet portion,
 (c) said axial dimension of said inlet portion constitutes a minor fraction of the thickness of said screening member and of said maximum diameter of said inlet portion,
 (d) said perforations are arranged in rows which define directions extending perpendicularly to each other along said cylindrical screening member,
 (e) the spacing of adjacent said perforations and said maximum diameter of said inlet portions thereof are such that each said inlet portion projects into space between adjacent said inlet portions in said rows extending on either side thereof in at least one of said perpendicular directions, and
 (f) the relative spacing of adjacent said perforations and the maximum diameter of said inlet portions thereof are such that adjacent said inlet portions define ridges on the surface of the inlet side of said screening member,
 (g) whereby upon use of said screening member as defined hereinabove, said ridges cooperate with said rotor to create patterns of irregular eddies adjacent the inlet ends of said perforations 10. A cylindrical screening member as defined in claim 9 wherein the spacing of adjacent said perforations and said maximum diameter of said inlet portions thereof are such that each said inlet portion projects into space between adjacent said inlet portions in said rows extending on either side thereof in both of said perpendicular directions.

11. A cylindrical screening member as defined in claim 9 wherein said perforations are arranged in rows extending axially and circumferentially of said screening member, and wherein the spacing of adjacent said perforations and said maximum diameter of said inlet portions thereof are such that each said inlet portion projects into space between adjacent said inlet portions in said rows extending on either side thereof both axially and circumferentially of said screening member.

12. A cylindrical screening member as defined in claim 9 wherein the sum of the areas covered by said inlet portions including said cylindrical portions associated therewith is substantially greater than one-half the total surface area of said screening member.

13. A cylindrical screening member as defined in claim 9 further characterized by the fact that the value $\pi r^2 n$, wherein r is the maximum radius of each of said inlet portions and n is the total number of said perforations, equals more than three-quarters of the total surface area of said screening member.

14. A cylindrical screening member as defined in claim 9 wherein the value $\pi r^2 n$ exceeds the total surface area of said screening member.

15. A cylindrical screening member as defined in claim 9 wherein each of said perforations includes a discharge end portion which is of progressively greater diameter in the direction of said accepts chamber than said minimum diameter and is substantially greater in axial length than the sum of the axial dimensions of said cylindrical portion and said inlet portion of said perforation.

16. A cylindrical screening member as defined in claim 9 which is of predetermined uniform thickness and wherein the total of the axial dimensions of said inlet portion and said cylindracl portion of each said perforation is less than one-half the thickness of said screening member.

17. A cylindrical screening member as defined in claim 9 wherein said frustoconical inlet portion forms a relatively small angle with the surrounding surface of said screening member.

18. Screening appartus as defined in claim 17 wherein said angle is in the order of 22.5°, 19. Screening appartus as defined in claim 9 wherein said dimensions and spacings are such that some of said adjacent inlet portions intersect.

* * * * *

UNITED STATES PATENT AND TRADEMARK OFFICE
CERTIFICATE OF CORRECTION

PATENT NO. : 4,717,471
DATED : January 5, 1988
INVENTOR(S) : Jimmy L. Winkler

It is certified that error appears in the above-identified patent and that said Letters Patent is hereby corrected as shown below:

Column 2, line 62, "small" should be --relatively small--.

Column 4, line 28, "tapering" should be --tapering outwardly--; line 62, "form" should be --from--.

Column 5, line 25, "In another example" should begin a new paragraph; line 65, "alternative" should be --alternating--.

Column 6, line 6, "portions" should be --portion--.

Column 7, line 21, "cylindric" should be --cylindrical--.

Column 8, line 39, "cylindracl" should be --cylindrical--; line 47, the comma at the end of the sentence should be a period.

Signed and Sealed this

Fifth Day of July, 1988

*Attest:*

DONALD J. QUIGG

*Attesting Officer*  *Commissioner of Patents and Trademarks*